Feb. 19, 1963 W. M. JEFFERS 3,078,441

TRAFFIC SIGNAL CONTROLLER

Filed Aug. 28, 1958 12 Sheets-Sheet 1

INVENTOR.
*Walter M. Jeffers*

BY
*D. Emmett Thompson*
ATTORNEY

INVENTOR.
Walter M. Jeffers
BY
D. Emmett Thompson
ATTORNEY

INVENTOR.
Walter M. Jeffers
BY
D. Emmett Thompson
ATTORNEY

Feb. 19, 1963 W. M. JEFFERS 3,078,441

TRAFFIC SIGNAL CONTROLLER

Filed Aug. 28, 1958 12 Sheets-Sheet 4

INVENTOR.
Walter M. Jeffers
BY
D. Emmett Thompson
ATTORNEY

INVENTOR.
*Walter M. Jeffers*
BY
*D. Emmett Thompson*
ATTORNEY

Feb. 19, 1963 W. M. JEFFERS 3,078,441

TRAFFIC SIGNAL CONTROLLER

Filed Aug. 28, 1958 12 Sheets-Sheet 6

INVENTOR.

Walter M. Jeffers

BY

D. Emmett Thompson

ATTORNEY

Feb. 19, 1963 W. M. JEFFERS 3,078,441

TRAFFIC SIGNAL CONTROLLER

Filed Aug. 28, 1958 12 Sheets-Sheet 7

INVENTOR.
Walter M. Jeffers
BY
D. Emmett Thompson
ATTORNEY

INVENTOR.
Walter M. Jeffers
BY
D. Emmett Thompson
ATTORNEY

INVENTOR.
Walter M. Jeffers
BY
D. Emmett Thompson
ATTORNEY

TRAFFIC SIGNAL CONTROLLER

INVENTOR.
Walter M. Jeffers

BY
D. Emmett Thompson

ATTORNEY

INVENTOR.
Walter M. Jeffers
BY
D. Emmett Thompson
ATTORNEY

Feb. 19, 1963 W. M. JEFFERS 3,078,441

TRAFFIC SIGNAL CONTROLLER

Filed Aug. 28, 1958 12 Sheets-Sheet 12

INVENTOR.
Walter M. Jeffers

BY
D. Emmett Thompson
ATTORNEY 3,078,441

TRAFFIC SIGNAL CONTROLLER

Walter M. Jeffers, Syracuse, N.Y., assignor to Crouse-Hinds Company, Syracuse, N.Y., a corporation of New York Filed Aug. 28, 1958, Ser. No. 757,778
4 Claims. (Cl. 340—37)

This invention has to do with a controller for operating highway traffic signals at highway intersections. It is of the type used in conjunction with vehicle actuated systems, the controller being similar to that disclosed in my prior Patents 2,719,958 and 2,751,574.

This invention relates to and has as an object a new and improved semi-actuated traffic controller.

Briefly described, the controller functions to normally display the go or proceed signal to the main street at an intersection of a cross street with the main street. A detector is mounted for actuation by traffic approaching the intersection on the cross street and the detector actuations function to energize the controller through a cycle to change the signal being displayed to the main street from proceed to stop with an appropriate caution signal being displayed intermediate the proceed and stop signals. Simultaneously with the display of the stop signal to the traffic on the main street, a proceed signal is displayed to the traffic on the cross street.

More specifically, this application relates to and has as an object new and improved means for extending the total period of the display of the proceed signal to the cross street traffic in response to repeated actuations of the detector by the cross street traffic. The new and improved means just referred to takes the form of a timer which operates a conventional cam unit having a plurality of discrete positions for the various signal displays described above, wherein the cam unit is provided with a first cross street green or proceed interval, and a second proceed or cross street green extension interval, which second position is the next succeeding position through which the cam unit will be rotated. When the first timer has operated to cycle the cam unit to the cross street green extension position, one or more additional vehicle actuations of traffic proceeding on the cross street will serve to reset the timer to extend the period of cross street green extension period, and thus, the total cross street green interval. A second or maximum timer, however, operates to time out in order to limit to a predetermined maximum the total length of the cross street green interval and the maximum timer begins to time out when the cam unit reaches the cross street green extension position whereby the maximum timer functions independently of the first timer.

This invention consists in the novel features and in the combinations and constructions hereinafter set forth and claimed.

In describing this invention, reference is had to the accompanying drawings in which like characters designate corresponding parts in all the views.

In the drawings:

FIGURE 1 illustrates the controller in normal position with the go or green signal being displayed to the main street and the red or stop signal to the cross street.

FIGURE 2 illustrates the controller with the cam shaft in the same position as in FIGURE 1 but with the detector element in the cross street actuated.

Figure 1:
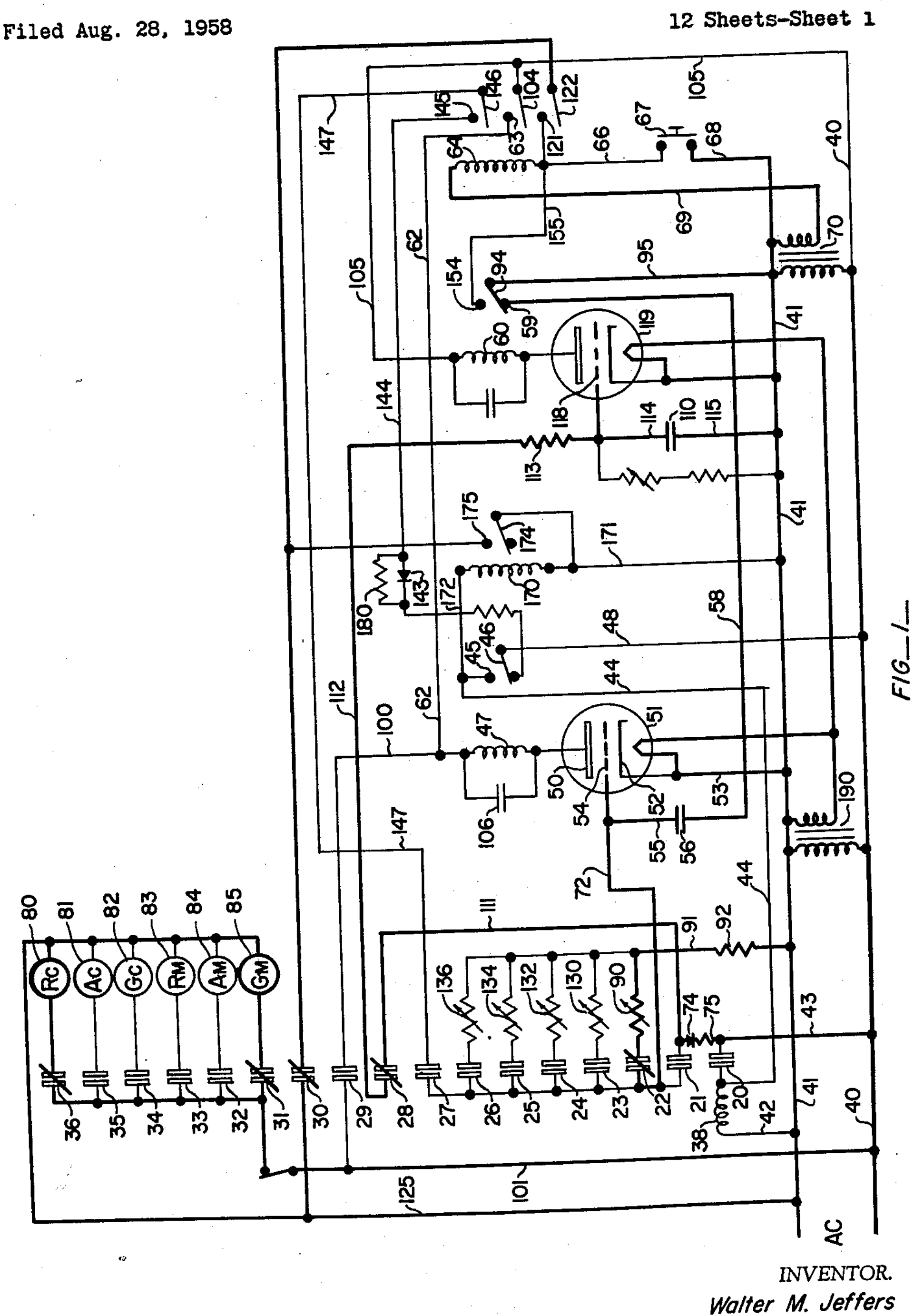
FIGURES 1 to 11 are schematic diagrams showing the circuit arrangement of the controller in various positions of the cam shaft during one cycle of operation, the heavy lines in each figure indicating the effective circuits that are then conducting current.
Figure 2:
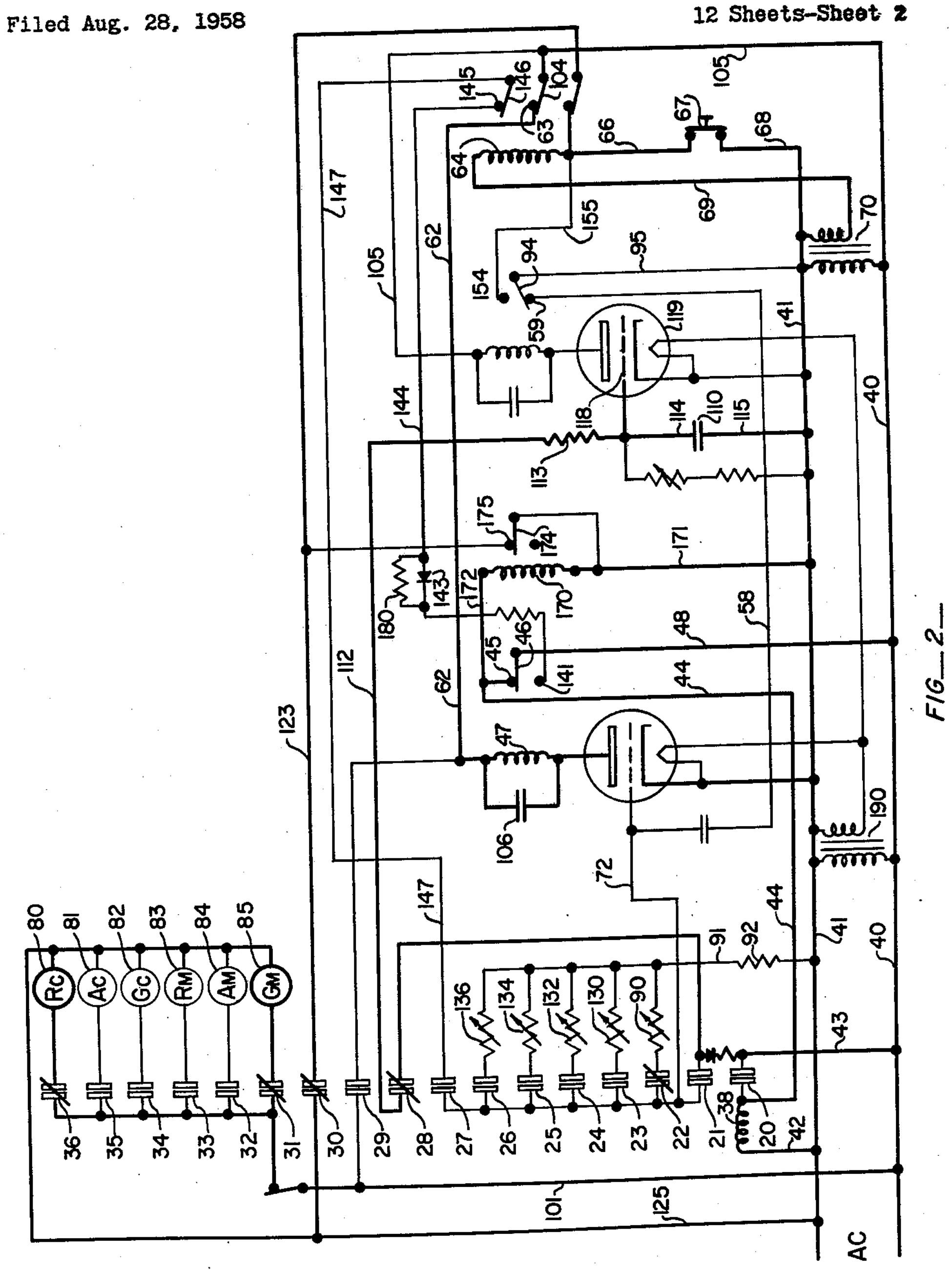
Figure 3:
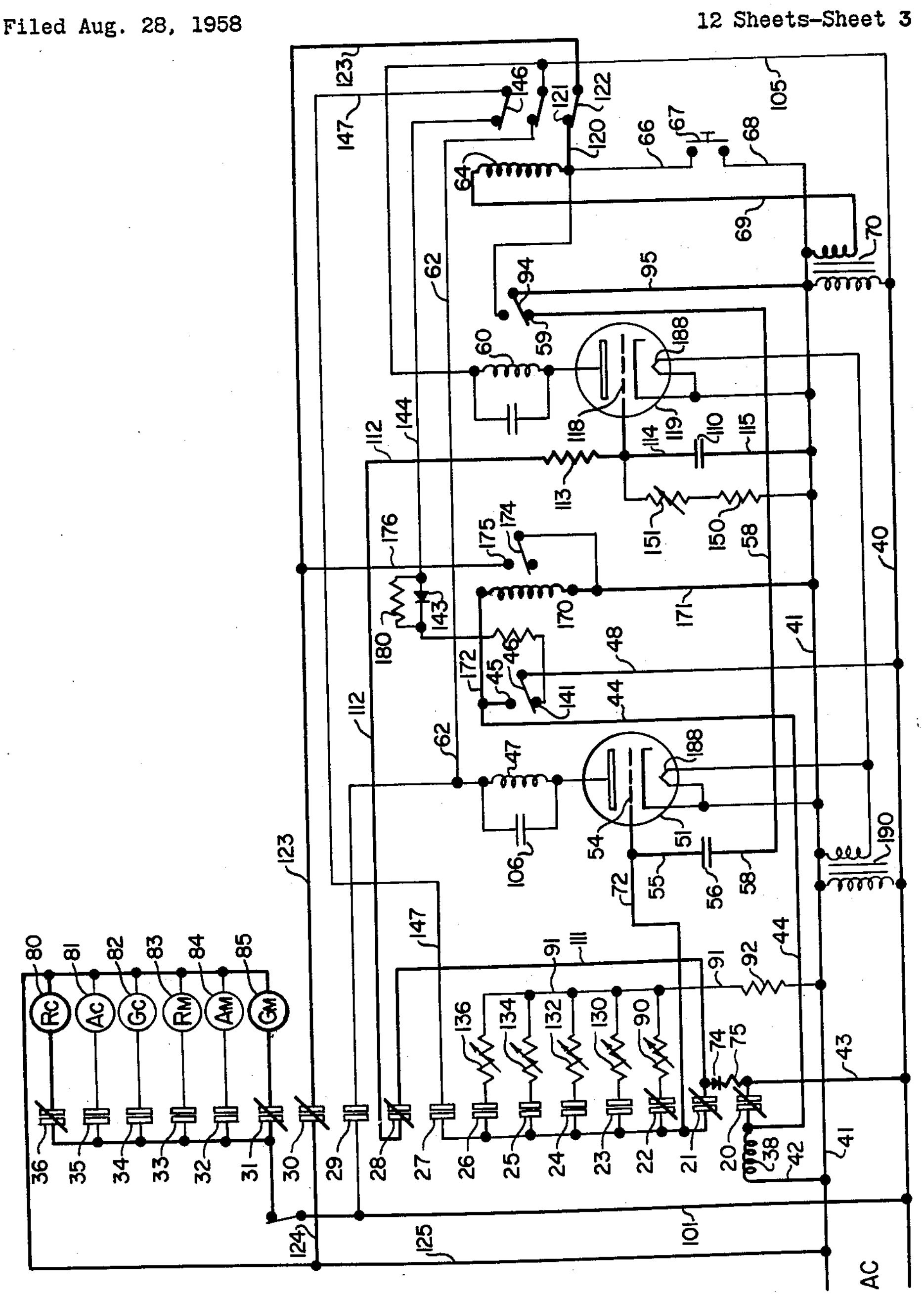
Figure 4:
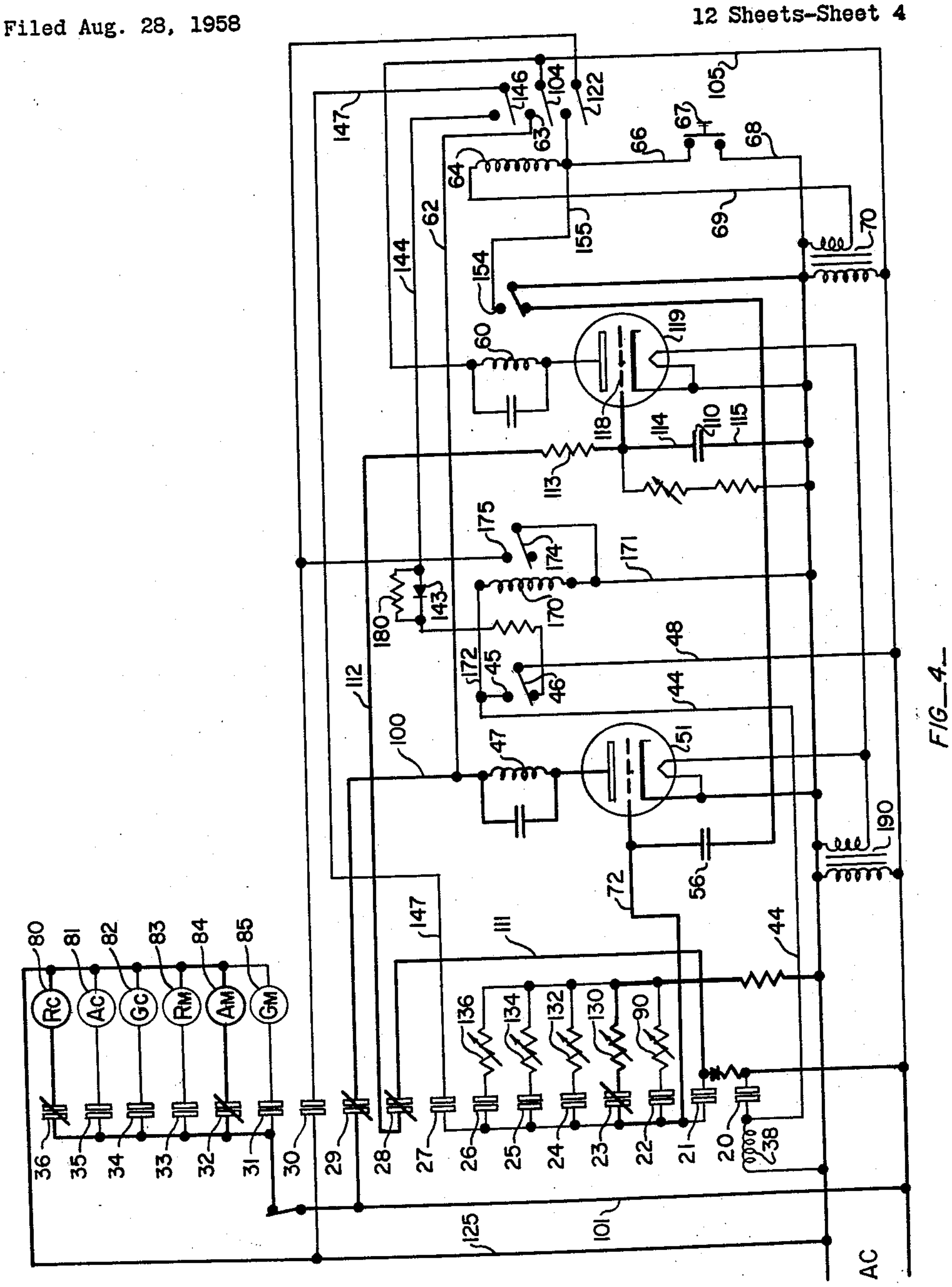

FIGURE 3 illustrates the condition when the cam shaft is running from position 1, shown in FIGURES 1 and 2, to position 2, which is shown in FIGURE 4.

FIGURE 4 illustrates the conducting circuits with the cam shaft advanced to the second position in which the amber or caution signal is displayed to the main street.

Figure 5:
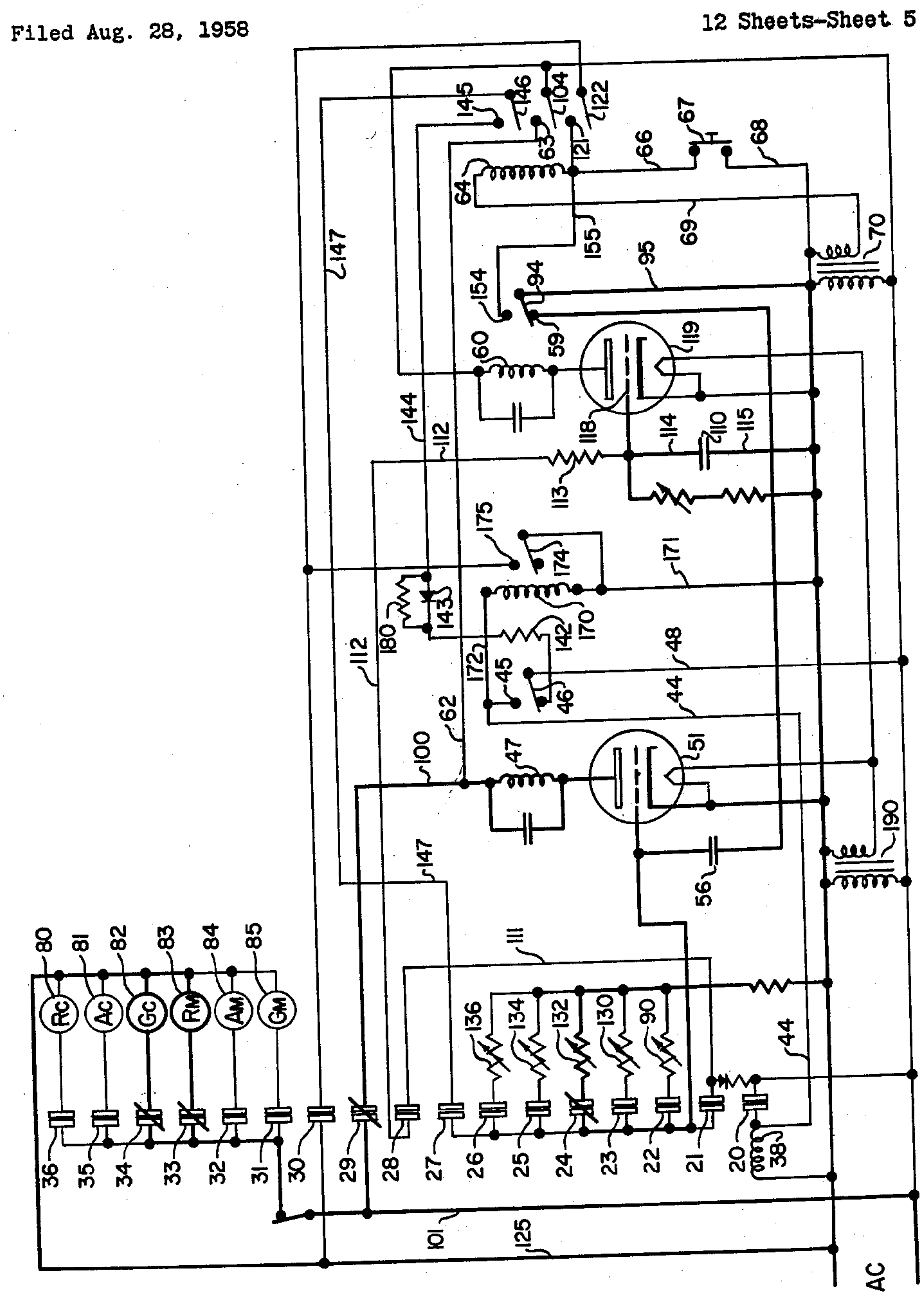

FIGURE 5 illustrates the controller with the cam shaft advanced to the third position which is the initial interval for the display of the go signal.

Figure 6:
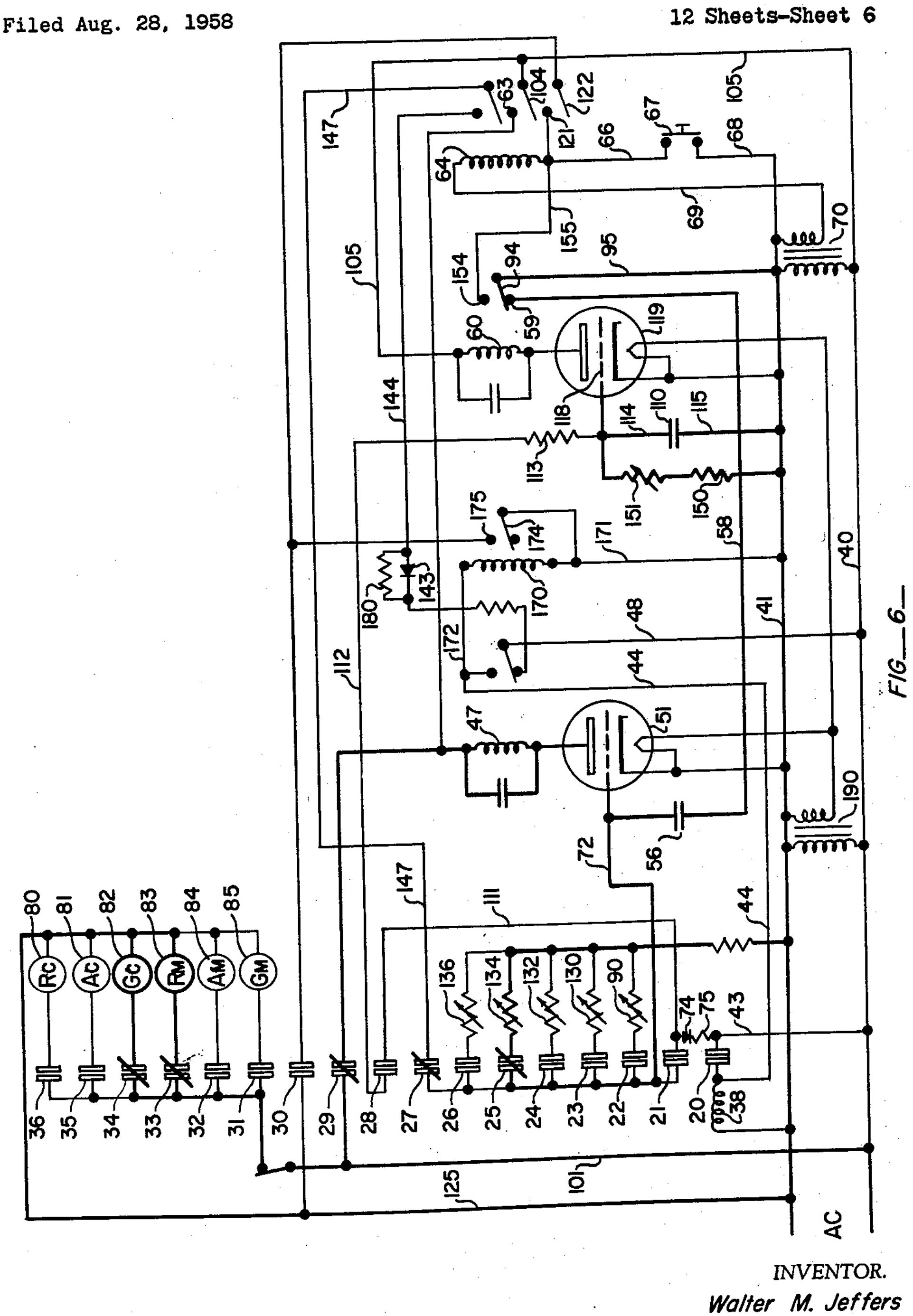

FIGURE 6 illustrates the controller with the cam shaft advanced to the fourth position which is the extension interval for the display of the green signal to the cross street.

Figure 7:
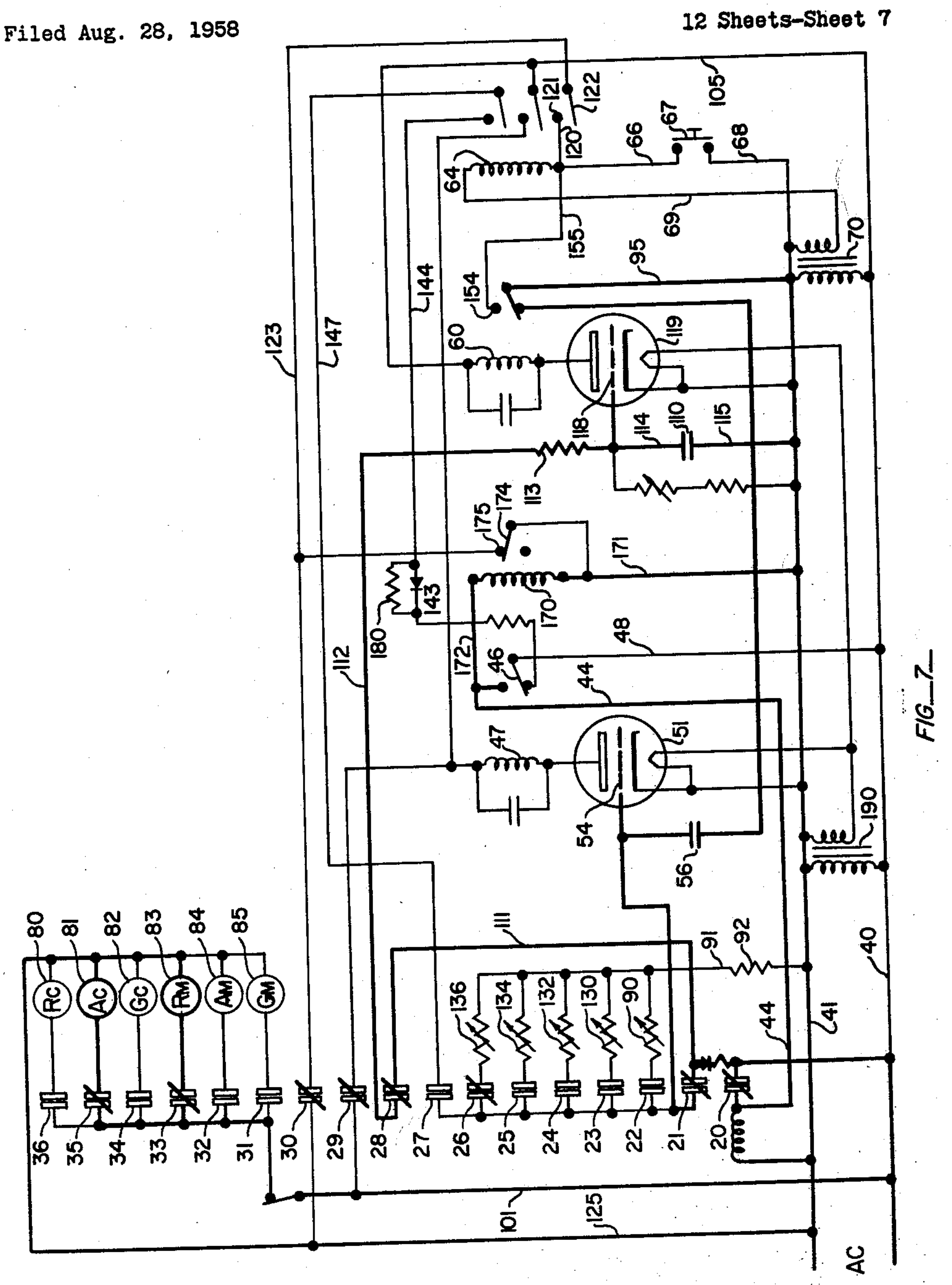

FIGURE 7 illustrates the controller with the cam shaft moving through position 5.

Figure 8:
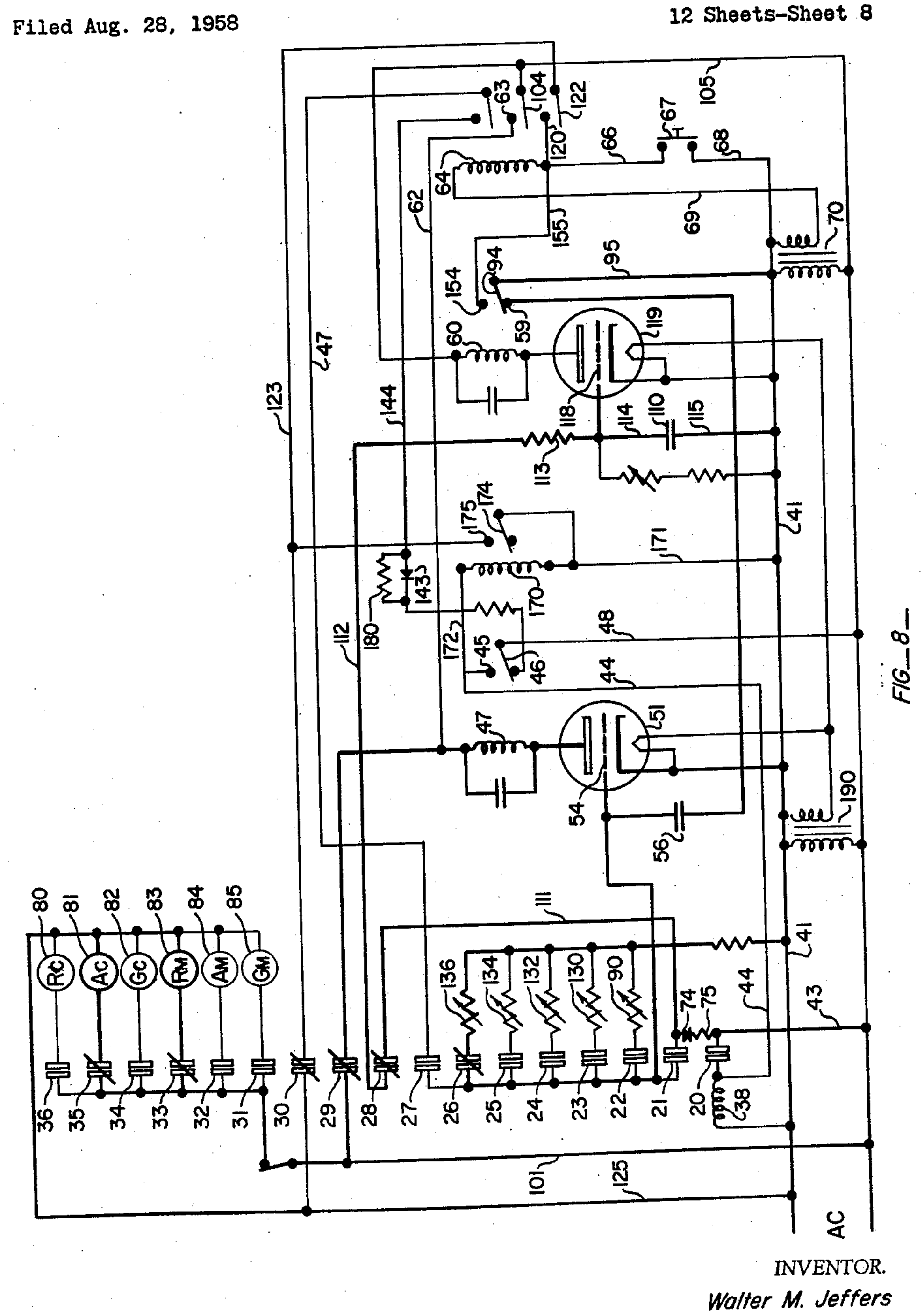

FIGURE 8 illustrates the controller in position 6 with the caution signal displayed to the cross street and the red signal persisting on the main street.

Figure 9:
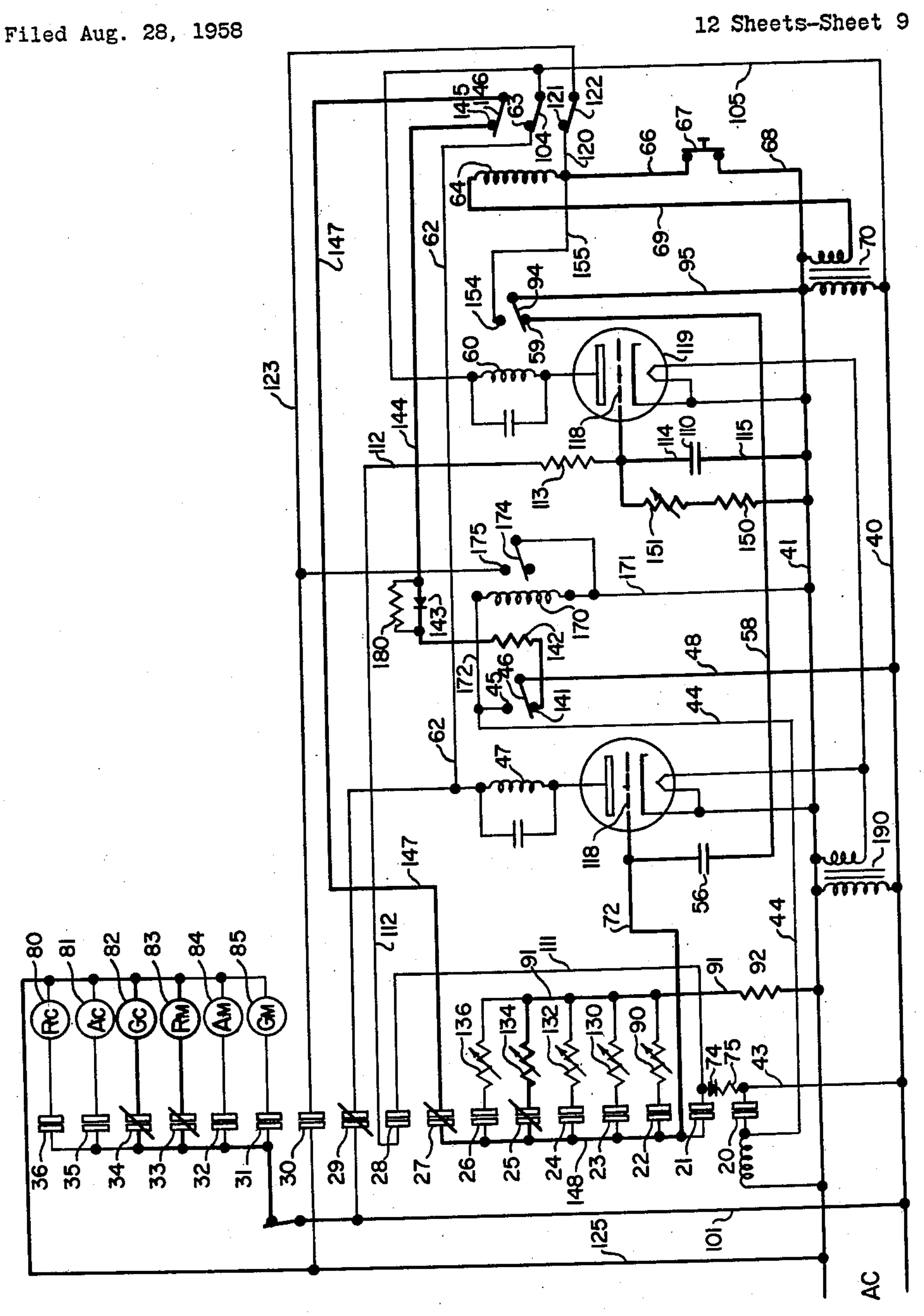

FIGURE 9 illustrates the controller again in position 4 with the signal display the same as shown in FIGURE 6 but with the vehicle detector actuated to effect extension of the extension interval.

Figure 10:
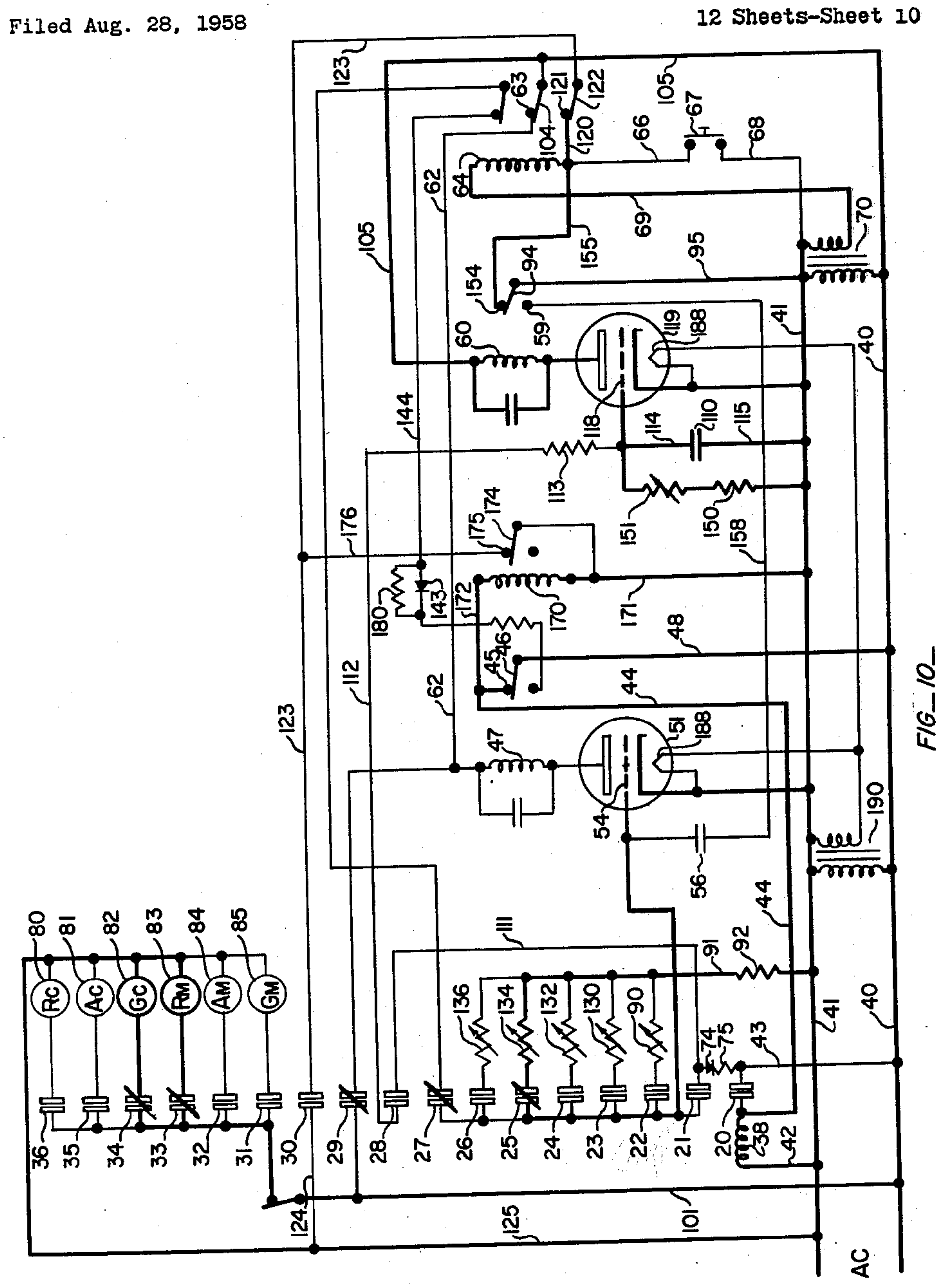

FIGURE 10 illustrates the controller in the position 4 but with the maximum timer timed out to terminate the extension interval.

Figure 11:
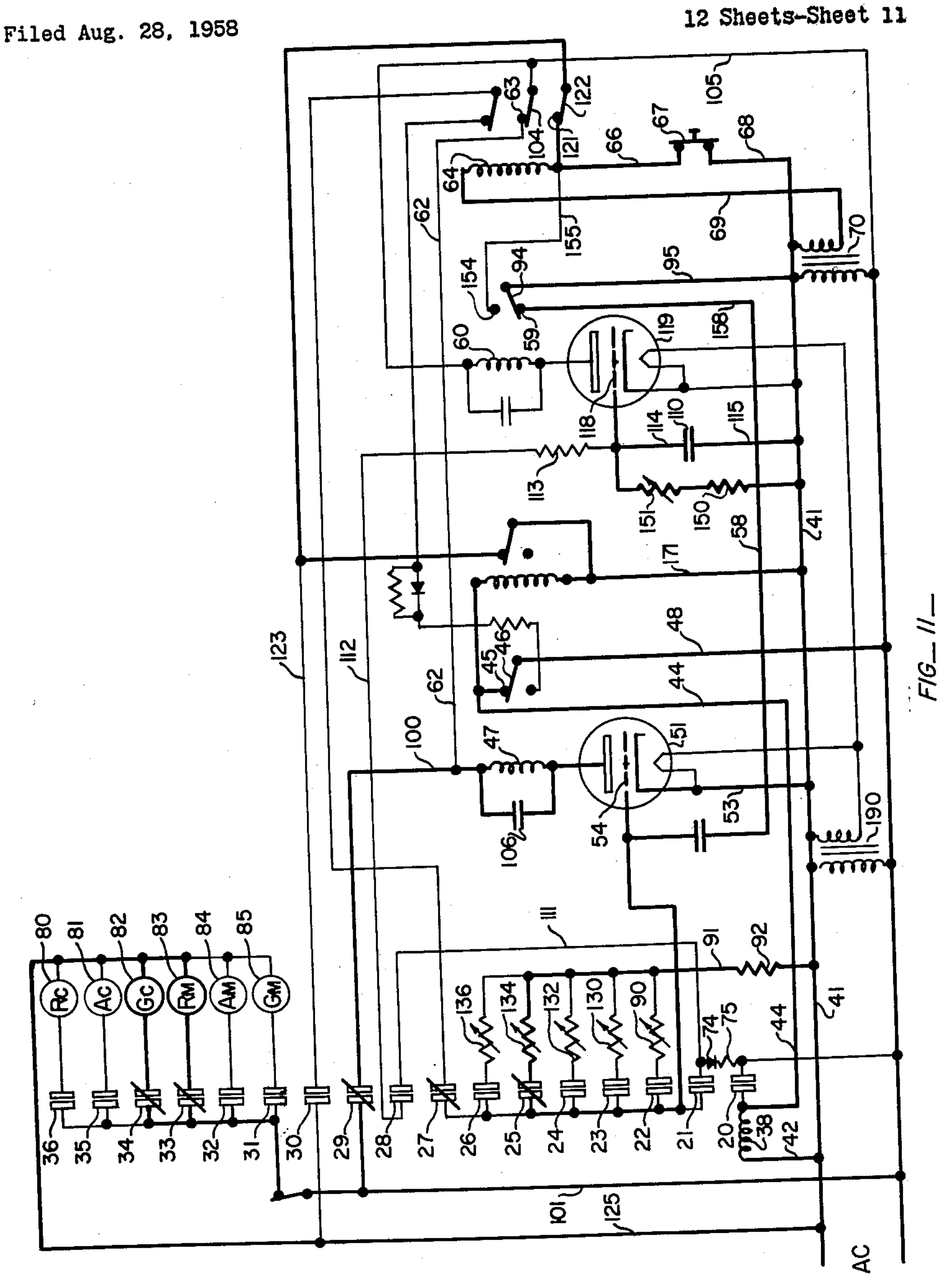

FIGURE 11 illustrates the effective circuits conducting current with the detector actuated just after the motor has started to move the cam shaft from position 4 to position 5.

Figure 12:
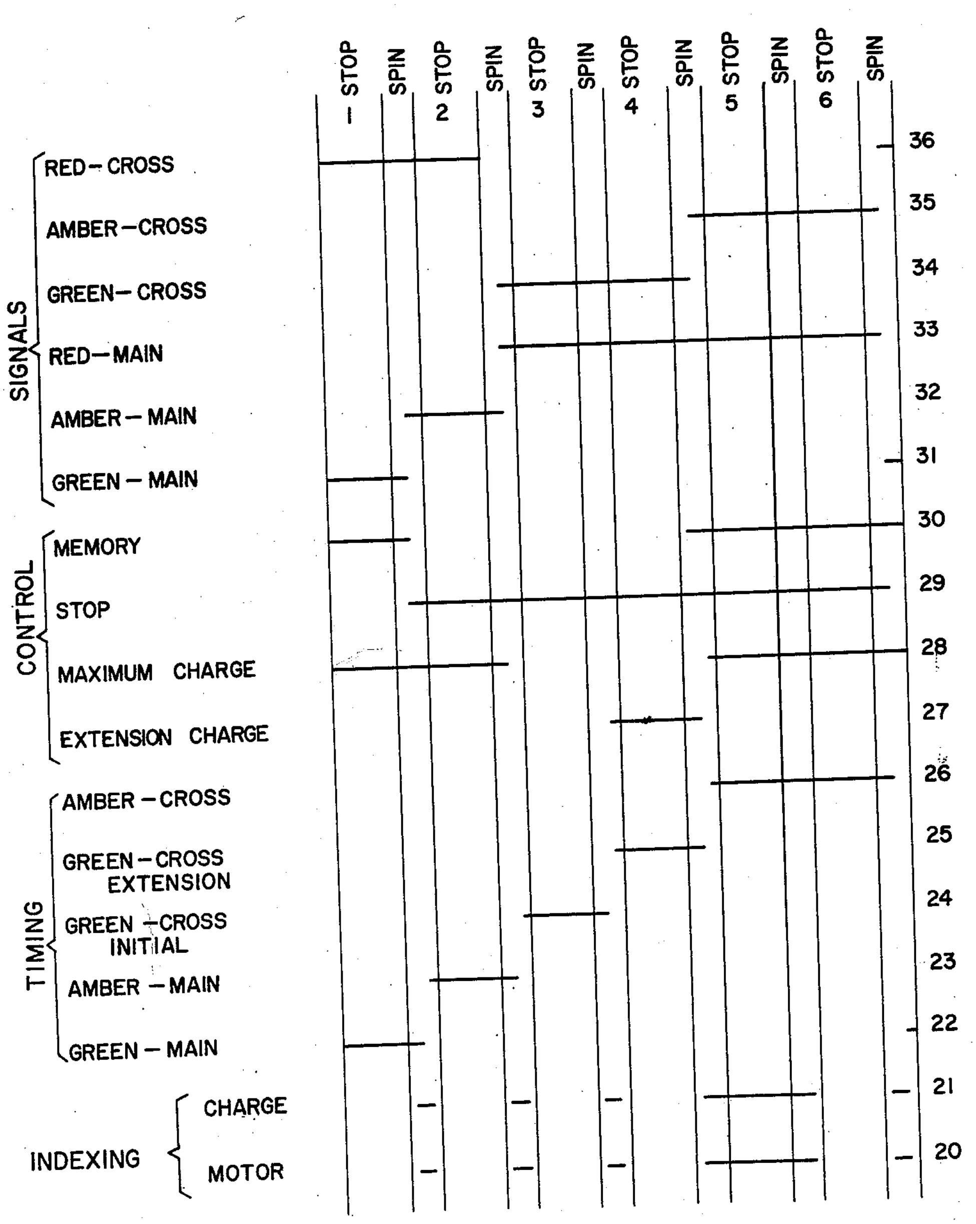

FIGURE 12 is a sequence chart showing the cam unit contacts that are closed in each position of the cam shaft.

The controller includes a cam shaft having a series of lobes mounted thereon for actuating a series of contacts 20–36. The cam shaft is rotated through a signal cycle by a motor 38. The motor 38 is, during each cycle, periodically energized to effect a step by step rotation of the cam shaft through a plurality of successive positions for the display of the traffic signals to the respective streets, the shaft being equipped with cams having lobes of different lengths and arranged in different angular positions for the proper operation of the contacts 20–36. The contacts 31–36 are connected in the signal circuits. The apparatus is connected to a power line supply having a hot side 40 and a common return 41.

The motor 38 is connected to the return 41 by wire 42. It is connected to the hot side 40 by wire 43 and cam contacts 20 which are closed while the motor is running from each position to the next, see contact chart FIGURE 12. The motor is also provided with a starting circuit consisting of wire 44, contacts 45, 46, of relay 47, wire 48 to line 40.

Relay 47 is connected to the plate 50 of a tube 51, the cathode 52 of which is connected by wire 53 to the common 41. A grid 54 of the tube is connected by wire 55 to a capacitor 56, the opposite side of which is connected by wire 58 to contact 59 of relay 60. The coil of relay 47 is also connected by wire 62 to contact 63 of relay 64.

Relay 64 is referred to as the detector relay because one side of the coil is connected to the return 41 by wire 66, detector 67, wire 68. The opposite side of the relay coil is connected by wire 69 to the secondary of the transformer 70, the primary of which is connected across the supply line 40, 41.

Inasmuch as the relay 47 is connected to the plate output of tube 51, the relay is only energized while the tube is conducting. The purpose of the capacitor 56 is to impress upon the grid 54 a high negative potential to keep the tube from conducting. The upper portion of the capacitor is connected through wires 55, 72, contacts 21, rectifier 74, limiting resistor 75, wire 43, to the hot side 40 of the supply. Accordingly, when the contacts 21 are closed, a charging circuit is provided for the capacitor 56 and because of the rectifier 74, the negative potential of full line voltage is applied to the grid 54 and while this charge is placed on the capacitor, the tube is non-conducting and relay 47 does not pull in, or effect engagement of the contacts 45, 46.

FIGURE 1 illustrates the normal position of the cam shaft, the slanting lines through the contacts 20–36 indicate, in all views of the drawings, those contacts that are closed.

Referring to the upper left hand portion of FIGURES 1 to 11, 80 designates the stop or red signal to the cross street; 81 designates the caution or amber signal to the cross street; 82 designates the go or green signal to the cross street; 83 designates the red signal to the main street; 84 designates the amber signal to the main street, and 85 designates the go signal to the main street.

In FIGURE 1, the controller is shown in what is termed the normal position—that is, with the green light displayed to the main street, and the red light 80 displayed to the cross street. The cam shaft is stepped one position forward for the display of the main street amber light to the third position for the initial interval of the display of the cross street green signal to the fourth position for the extension interval of the cross street green signal. The cam shaft is moved continuously from the fourth to the sixth position—that is, the motor spins the cam shaft through the fifth position without stopping, as will be explained hereinafter. In the sixth position, the cross street amber signal 81 is displayed and the controller then returns to the normal position 1, as shown in FIGURE 1. While the cam shaft is in positions 1, 2, 3 and 6, the capacitor 56 is connected to a discharge circuit. For example, referring to FIGURE 1, a discharge circuit is established through the closed cam contacts 22, variable resistor 90, wire 91, resistor 92, to the return 41. The fixed resistor 92 serves to provide a minimum limit on the interval being timed in order to prevent the setting of the adjustable timing resistors at such a low value as to make the interval impractical, or to make the discharge circuit a short circuit. The other side of the capacitor 56 is connected also to the return 41 through the wire 58, contacts 59, 94, of relay 60 and wire 95. The resistor 90 is adjusted to give the desired maximum length of time the controller is held in this position displaying the go signal to the main street. That is, the setting of the resistor 90 determines the length of the interval required to discharge the capacitor 56 to lower the negative potential on grid 54 to the value where the tube will conduct and pull in relay 47. However, in this position 1 of the cam shaft, the circuit is not completed for relay coil 47 due to the fact the cam contacts 29 are open, see FIGURE 12, during this first position in which the green signal is displayed to the main street, the top of the relay coil being connected by a wire 100 to the contact 29, and by wire 101 to the hot side 40 of the supply.

FIGURE 2 is illustrative of the situation when the detector 67 is actuated. This completes a circuit from the transformer 70 to the relay 64, closing the contacts thereof. The movable contact 104 is connected by wire 105 to the hot side 40 of the supply. This contact is now moved into engagement with contact 63 to complete a circuit through wire 62 to the upper end of the relay coil 47. The relay 47 is thus energized, closing contacts 45, 46, to complete a circuit from the hot side 40, wire 48, contacts 45, 46, wire 44, to the motor 38, causing the motor to start and effect rotation of the cam shaft. This provides a starting circuit for the motor 38 and immediately upon movement of the cam shaft, the running contacts 20 close to supply power through the wire 43 to effect operation of the cam shaft until it reaches the second position. The contacts 20 close during spinning interval of the cam shaft from one position to the next, see FIGURE 3. They are also closed during position 5, see FIGURE 12, as will be explained hereinafter. A capacitor 106 is connected in shunt with the relay coil 47 to reduce chattering of the relay contact 46, as will be well understood.

During the movement of the cam shaft from position 1 to position 2, FIGURE 3, the charging contacts 21 also close to provide a charging circuit for the capacitor 56 through wire 43, resistor 75, rectifier 74, contacts 21, wires 72, 55. As previously stated, the other side of the capacitor is connected by wire 58 through the contacts 59, 94, wire 95, to the return line 41, whereby the capacitor is instantaneously charged to full line voltage.

During positions 1 and 2, the contacts 28 are closed providing a charging circuit to a second capacitor 110, this circuit being from the rectifier 74, through wire 111, contacts 28, wire 112, resistor 113, wire 114, to capacitor 110, the opposite side of which is connected to return wire 41 by the wire 115. The upper side of the capacitor 110 is connected to grid 118 of tube 119, the purpose of which will be hereinafter explained. Also, during position 1, and part of the spin interval between positions 1 and 2, the contacts 30 are closed to provide a stick circuit for relay 64, this circuit extending from the transformer 70, wire 69, relay coil 64, wire 120, contacts 121, 122, wire 123, cam contacts 30, wire 124, wire 125, to the return wire 41. This is to make certain that the relay 64 is held in to effect certain operation of the cam shaft from position 1 to position 2.

When the cam shaft reaches the second position, see FIGURE 4, the running contacts 20 open to stop the motor, and the charging contacts 21 open. The contacts 22 connected to discharge resistor 90 open, and cam contacts 23 close, connecting discharge resistor 130 in the discharge circuit of the capacitor 56 to time out the controller for this position. In this position 2, cam contacts 28 and 29 are also closed, the contacts 28 continuing the charge circuit for the capacitor 110. The contacts 29 complete the plate circuit of tube 51 to provide operating current to the relay 47 when the capacitor 56 has timed out, the contacts 29 connecting wire 100 to wire 101. In this second position, cam contacts 32 are closed, completing circuit to the amber, or caution, light 84 confronting the main street, the contacts 36 remain closed displaying the red light 80 to the cross street.

FIGURE 5 illustrates the arrangement when the resistor 130, FIGURE 4, has timed out, permitting the tube 51 to become conductive to close contacts 45, 46, of the motor starting relay 47, causing the cam shaft to advance to position 3. With the cam shaft in position 3, contacts 24 are closed, connecting the discharge resistor 132 in the discharge circuit of capacitor 56, and cam contacts 29 are closed to complete the plate circuit of tube 51 for actuation of the motor starting relay 47 when the resistor 132 has timed out the capacitor 56. The signal contacts 33, 34, are now closed to provide the red signal 83 to the main street, and the green signal 82 to the cross street.

This position 3 of the cam shaft is the initial interval of the display of the green signal to the cross street and its duration is determined by the setting of the resistor 132. In other words, this initial interval is pre-timed.

FIGURE 6 illustrates the arrangement with the cam shaft in position 4. This is the extension interval for the display of the stop signal to the cross street, with signal cam contacts 33, 34, remaining closed together with cam contacts 29 to complete the plate circuit of tube 51. Contacts 25 are closed to connect resistor 134 in the discharge circuit of capacitor 56. This resistor 134 is set to time out at the end of a short period to terminate the interval if the detector 67 is not actuated during position 4. It will be remembered that the heavy lines on the various figures of the drawings indicate circuits that are conductive, and the slanting lines to the contacts 20–36 indicate that those contacts are closed.

FIGURE 7 of the drawings illustrates the condition of the cam shaft running to and through position 5. As soon as the cam shaft has been rotated to position 5, the contacts 34 open, discontinuing the display of the green signal 82 to the cross street, and cam contacts 35 close, displaying the amber signal 81 to the cross street. The contacts 33 remain closed, displaying the red signal 83 to the main street. During the movement of the cam shaft into and through position 5, the charging contacts 21 remain closed, maintaining the high negative potential on the grid 54 of tube 51, and the motor running contacts 20 are closed. In other words, the cam shaft rapidly spins through position 5. The purpose of this short interval during which the cam shaft is in continuous motion is to make certain of sufficient time for the accomplishment of certain necessary switching of control circuits. This interval is not required as far as the color sequence is concerned and could be omitted by providing lobes on the cam shaft of proper angular extent for actuation of the cam shaft contacts. In the arrangement disclosed in the drawings, a standard cam shaft structure already in extensive use is employed and this spin through position provides ample time for the setting up of the proper control when the cam shaft reaches position 6, which is illustrated in FIGURE 8 of the drawings.

In position 6, contacts 33, 35, continue to be closed, displaying the amber signal to the cross street and the red signal to the main street. Contacts 26 are closed connecting the resistor 136 in the discharge circuit for the capacitor 56, and the cam contacts 29 are closed to provide power for the plate circuit of tube 51 for operation of the motor starting relay 47 when the resistor 136 is timed out. Also, the cam contacts 28 are closed to complete the charging circuit for the capacitor 110, this charging circuit extending from the rectifier 74, wire 111, contacts 28, wire 112, resistor 113, wire 114, and capacitor 110, the opposite side of which is connected to the common return 41 by wire 115. When the resistor 136 times out, the tube 51 becomes conductive, closing the contacts 45, 46, of relay 47 to complete the starting circuit to the motor 38 to move the cam shaft into position 1, thus completing the cycle of operation where there has been no actuation of detector 67 during the extension interval of the cross street go signal.

This invention is directed primarily to the arrangement for handling the extension interval in position 4 for the extension of the display of the green signal 82 to the cross street.

It will be recalled in reference to FIGURE 6 illustrating position 4 of the cam shaft, which is the position for the extension of the cross street go signal, the cam contacts 27 were closed while cam contacts 28 were opened.

In the event a car approaching on the cross street actuates the detector 67 to pull in relay 64 a charging circuit is provided for the capacitor 56 as follows. From side 40 of the power supply (see FIGURE 9) through wire 48, contacts 46, 141, resistor 142, rectifier 143, wire 144, contacts 145, 146 of relay 64, wire 147, buss 148, wire 72, capacitor 56, the opposite side of which is connected to the line 41 through wire 58, contacts 59, 94 of relay 60 and wire 95. The closing of the detector 67 is only momentary but the capacitor 56 becomes fully charged at line voltage. This means that the capacitor has to discharge through the resistor 134 and the interval is thus extended according to the setting of the resistor 134. This is repeated for each car actuating the detector during position 4 of the cam shaft. This could go on indefinitely if cars continued to cross the detector and were spaced closer together in time than the length of the extension interval determined by the resistor 134. This monopoly of the right of way for the cross street is limited by a maximum timer in the form of the tube 119, the operation of which is controlled by the charge on the capacitor 110.

It will be recalled that the capacitor 110 is charged by the rectifier 74 and cam contacts 28. These contacts are closed during positions 1, 2, 5 and 6 in the arrangement shown. A discharge circuit, including a fixed resistor 150 and a variable resistor 151, is fixedly connected to the capacitor 110. This discharge circuit is effective to lower the potential on grid 118 to a point where the tube is conductive, upon the expiration of position 3, plus an interval to permit the passage of a predetermined number of cars in position 4.

FIGURE 10 illustrates the arrangement when the capacitor 110 has timed out through the resistors 150, 151 and the tube 119 has become conductive to operate relay 60. Contact 94 has now moved out of engagement with contact 59 and into engagement with contact 154 completing the return circuit for relay 64 through wires 95, 155. This operation of relay 60 also disconnected the lower side of capacitor 56 from the return wire 41. This causes the grid 54 of tube 51 to assume practically zero potential. This is because cam contacts 25 are closed connecting the grid through resistors 134, 92 to the neutral 41 which is also connected to the cathode of the tube. Accordingly, the tube immediately becomes conductive closing contacts 45, 46 to provide the starting circuit for the motor 38 to effect movement of the cam shaft into position 5.

Also, as previously stated, the closed contacts 94, 154 of relay 60 shunt the detector 67 to pull in the relay 64.

Referring to the cam chart, FIGURE 12, it will be observed the memory contacts 30 close immediately upon movement of the cam shaft from position 4 and they remain closed during positions 5, 6 and 1. These contacts establish a holding circuit for the relay 64 through its contacts 12, 122, whereby the relay 64 will not drop out until the cam shaft has been advanced out of position 1, which is at the termination of the display of the green signal to the main street. This arrangement thus effects automatic activation of the memory feature. It will be understood that the capacitor 110 of the maximum timer does not ever time out unless there has been heavy traffic on the cross street to effect more extensions than allowed by the maximum timer. This means that there is at least one car which actuated the detector 67 and was not able to get through the intersection, so by locking up the relay 64 the controller will automatically repeat another cycle to accommodate that car.

Again, referring to FIGURE 12, it will be noted that the charging contacts 21 for the capacitor 54 close during the spin interval between positions 4 and 5 an instant prior to the closing of the maximum charge contacts 28. This is to make certain that once the motor 38 starts to spin the cam shaft from position 4 to position 5 it will not be interrupted. The closing of the charge contacts 21, during this spin interval, cannot place a charge on the capacitor 56 because contacts 59, 94 of relay 60 are not closed until after the capacitor 110 has been charged through the contacts 28 to release relay 60, thereupon capacitor 56 will receive its charge releasing relay 47 so that the cam unit will be ready to stop when position 6 is reached.

A feature of this invention is the provision of the additional, or separate, rectifier 143 and the extension charge contacts 27 for recharging the capacitor 56 by additional cars during the extension interval position 4. This circuit also extending through the contacts of relay 47 when the same is de-energized. Accordingly, when relay 47 closes at the end of the extension interval it interrupts this recharge in circuit so capacitor 56 cannot be recharged. This assures a complete forward movement of the cam shaft from position 4 into position 5 regardless of any actuations of detector 67 that may occur once the movement of the cam shaft has started.

In the arrangement shown there is provided a relay 170 connected to the common return 41 by wire 171. The top of the coil is connected to contact 45 of relay 47 by wire 172. Accordingly, each time the tube 51 becomes conductive pulling in relay 47, relay 170 is also energized through contacts 45, 46 of relay 47. Relay 170 has a movable contact 174 movable into engagement with a fixed contact 175 connected by wire 176 to wire 123 whereby the contacts 174, 175 are connected in parallel with the memory cam contacts 30 so that the memory circuit will be effective any time that the motor 38 is running. Therefore, if there is an actuation of the detector 67 at any time during the running of the motor, relay 170 will provide a stick circuit for the memory relay 64.

This arrangement is helpful in the event the cross street green extension, in position 4 of the cam shaft should time out through resistor 134 prior to the timing-out of the maximum timer tube 119, and a car should actuate the detector 67 just after the motor was starting to run. Referring to the chart shown in FIGURE 12, it will be observed that the memory contacts 30 do not close until the motor has operated during a portion of the spin interval between positions 4 and 5. The controller having once begun to move from position 4 to position 5, recharging of the capacitor 56 by an additional actuation of detector 67 is prevented, as previously explained. Accordingly, under the example given, the car actuating the detector would not get any time extension and normally it would not get any memory because the contacts 30 have not yet reclosed. The relay 170 is employed to avoid such a situation. The contacts 174, 175 could, of course, be added as a second pole on the relay 47. However, relay 47, being operated by tube 52, is somewhat critical in its operation and it is obviously most important that this relay function with complete efficiency in that it controls the starting circuit for the cam shaft motor and, therefore, it is preferable to employ the separate relay 170 for obtaining this function and, in addition, relays 47, 60 and 170 are of an identical type and construction which provides for a more economical construction.

Resistor 180 is connected across to rectifier 143. This resistor is of high value and provides a slight back leakage to provide some positive potential on the grid 54 on the positive half cycle of the power supply in phase with the potential on the plate of tube 51, this to prevent any small amount of negative charge on the grid due to capacitance in the wire.

In other words, it makes certain that the grid 54 will swing to the cathode potential in all instances.

The filaments 188, of tube 51, 119 are supplied with power from the transformer 190.

What I claim is:

1. A semi-actuated traffic controller for controlling a traffic signal display sequence to an intersection of a main street and a cross street, at least one of said streets being provided with vehicle detector means, said detector means being interconnected with said controller and said controller being provided with a power supply, said controller being also interconnected with a plurality of traffic signals, said controller including a cam unit rotatable through a cycle having a plurality of discrete positions for energizing said signals in a pre-selected sequence; said controller including a first timer having a normally closed timing circuit, said timer being operable to initiate and control cyclical movement of said cam unit through said plurality of discrete positions, said detector means being operable upon actuation to energize said timer to rotate said cam unit through one or more positions to an initial position wherein the proceed signal and the stop signal for said cross and main streets, respectively, are connected to said power supply, said first timer controlling the length of dwell of said cam unit in said initial position and a next succeeding extension position of said cam unit in which said proceed signal for said cross street is also connected to said power supply, the length of dwell of said cam unit in said extension position being extended by said timer in response to additional actuations of said detector means only while said cam unit is in said extension position, the total length of dwell of said cam unit in said extension position being limited to a predetermined maximum by a second or maximum timer, said second or maximum timer being operable upon energization in said extension position independently of the operation of said first timer to open said normally closed timing circuit to prevent any additional extension of the length of dwell of said first timer regardless of further actuations of said detector means.

2. The controller of claim 1, wherein said first timer includes a capacitor and an electron discharge tube, said capacitor being connected to a charging potential through said cam unit between certain positions of said cam unit, said capacitor discharging in each of a plurality of positions of said cam unit to control the length of dwell in the unit of each of said positions, whereby upon completion of the discharge of said capacitor, said electron tube will become conductive to energize said cam unit to move the cam unit from one position to the next succeeding position, said second timer including a capacitor and an electron tube, said second timer having a relay connected in the plate circuit of the electron tube of said second timer, said relay being operable when said tube becomes conductive, said capacitor for said second timer being connected to a charging potential through said cam unit, and being charged in each position of said cam unit, except in at least said extension position for displaying the proceed signal to the cross street, whereby upon discharge of said capacitor in said maximum timer, said plate relay will be energized to terminate the display of the proceed signal to the cross street.

3. The controller of claim 2, wherein energization of the plate relay of said maximum timer serves to energize a memory circuit, said memory circuit being maintained through said cam unit to recycle said cam unit to said initial position in which the proceed signal is displayed to the cross street, said relay having a contact movable between first and second positions and movable upon energization of the relay from said first position to said second position to both terminate the display of the proceed signal to the cross street and to energize said memory circuit.

4. A semi-actuated traffic controller for controlling a traffic signal display sequence to an intersection of first and second lanes, at least one of said lanes being provided with vehicle detector means, said detector means being interconnected with said controller, and said controller being provided with a power supply, said controller also being interconnected with a plurality of traffic signals, said controller including a cam unit rotatable through a cycle including a plurality of discrete positions for energizing said signals in a pre-selected sequence to control the movement of traffic on the lanes through the intersection, said controller including a first timer having a timing circuit including a capacitor, an electron discharge tube, and a relay, said electron discharge tube being controlled by the charge value on said capacitor, said timing circuit further including a plurality of variable resistors to selectively discharge said capacitor, each one of said resistors being associated with a particular position of said cam unit, and each resistor being connected through said cam unit to said capacitor in its particular position, the capacitor being connected to a source of charging potential through said cam unit for charging said capacitor between each position of said cam unit, said detector means being operable upon actuation to energize said relay to rotate said cam unit through one or more positions to an initial position wherein the proceed signal for said second lane is connected to said power supply, a next succeeding extension position of said cam unit in which said proceed signal for said second lane is also connected to said power supply, the length of dwell of said cam unit in said extension position being extended by said timer in response to additional actuations of said detector means occurring only while said cam unit is in said extension position, the total length of dwell of said cam unit in said extension position being limited to a predetermined maximum by a second or maximum timer, said maximum timer including a capacitor, an electron discharge tube, a relay, and a discharge resistor for said capacitor, said relay in said maximum timer having a movable contact having first and second positions, said capacitor in said first timer being normally connected to said movable contact in said first position to complete said timing circuit for said capacitor for both charging and discharging said capacitor, said capacitor in said maximum timer being connected to a source of charging potential through said cam unit in each position of said cam unit except in at least said extension position, said capacitor in said maximum timer discharging through its discharge resistor in said extension position to limit the total length of the interval during which the proceed signal is displayed to said second lane and said relay in said maximum timer being operable upon discharge of said capacitor to move said maximum timer movable contact from said first position into said second position to open said timing circuit and terminate the control of the capacitor in said first timer over said tube in said first timer whereby to terminate immediately the second lane proceed interval, said movable contact in the relay of said maximum timer being operable in said second position to energize a memory circuit, said memory circuit being maintained through said cam unit to recycle said cam unit to said initial position in which the proceed signal is displayed to the second lane.

References Cited in the file of this patent

UNITED STATES PATENTS

| | | |
|---|---|---|
| 2,448,113 | Olafson | Aug. 31, 1948 |
| 2,719,958 | Jeffers | Oct. 4, 1955 |
| 2,751,574 | Jeffers | June 19, 1956 |
| 2,796,595 | Schulenberg | June 18, 1957 |